Aug. 11, 1942.　　　W. J. HALL　　　2,292,755
MOLDING
Filed April 7, 1941
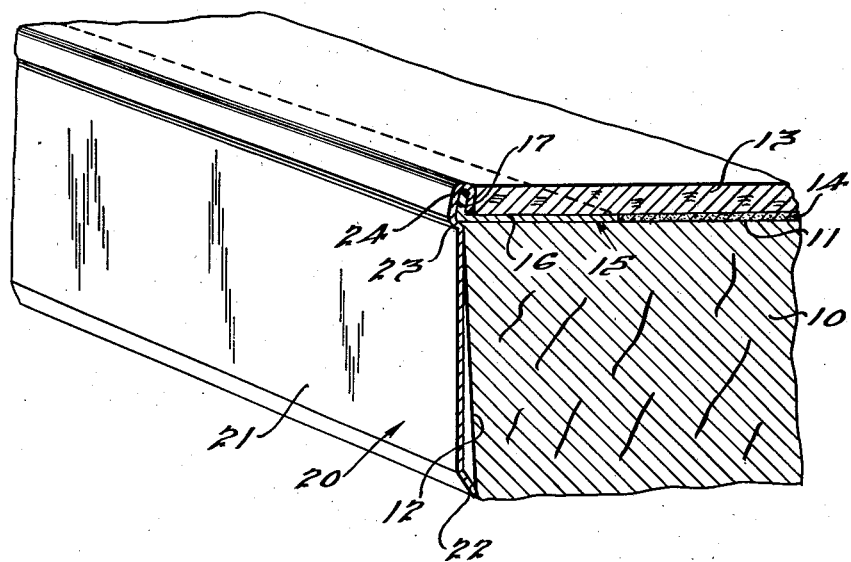
INVENTOR
William J. Hall.
BY
Harness, Dickey & Pierce
ATTORNEYS.

Patented Aug. 11, 1942

2,292,755

UNITED STATES PATENT OFFICE 2,292,755

MOLDING

William J. Hall, Detroit, Mich., assignor to Herron-Zimmers Moulding Company, Detroit, Mich., a corporation of Illinois Application April 7, 1941, Serial No. 387,130

7 Claims. (Cl. 311—107)

The invention relates to molding and it has particular relation to a counter edge molding or the like.

One object of the invention is to provide a molding of the character indicated which is less expensive to build while still obtaining the desired strength and ornamental characteristics.

Another object of the invention is to provide an improved molding for counter edges or the like where an inexpensive anchoring metal is employed in conjunction with a more expensive ornamental metal.

Another object of the invention is to provide molding such as last specified wherein the strips are interlocked in an efficient manner which forms a shoulder along the molding.

Other objects of the invention will become apparent from the following specification, the drawing relating thereto, and from the claims hereinafter set forth.

With respect to the drawing, the single figure illustrates molding constructed according to one form of the invention and applied to a counter edge.

Referring to the figure, a counter is indicated at 10 and the upper surface thereof is indicated at 11 and the side surface at 12. A cover layer 13 is shown disposed on the upper surface 11 and this layer might comprise a linoleum or similar material held by cement 14 to the counter.

Molding constructed according to one form of the invention comprises a strip or leg 15 having a flat body part 16 disposed on the surface 11 and under the edge of the cover 13 and which may be fastened to the counter by nailing or the like. This strip terminates at its outer edge in an upwardly directed flange 17 disposed at an acute angle to the body part.

A second part of the molding comprises an outer leg or strip 20 including a body part 21 extending downwardly over the side of the table and having an inwardly deflected lip 22 to insure a resilient, close fitting engagement of the lower edge with the counter. At its upper edge, the body part 21 is outwardly deflected as indicated at 23 and then is folded inwardly around the flange 17 as indicated at 24. It may be noted that the final edge of the folded portion substantially contacts the body part 16 of strip 15 and that the upper edge of flange 17 is slightly short of the reverse bend of the fold 24. It may be observed further that the deflected part 23 places the flange 17 substantially in the plane of the body part 21 of strip 20 and that such deflected part engages the strip 15 underneath the flange. The arrangement is such that the strips are locked against any loose relative movement.

While the leg 16 projects under and may be cemented to cover 13, it is understood that the leg is sufficiently thin that the cover is not undesirably raised at its edges especially if a thicker layer of cement is used inwardly of the leg. The folded over interlocking edge flanges or walls provide a desired cover for concealing the edge of the cover 13 and the inclination of the inner wall is such as to facilitate obtaining a neat, close fit at the upper side of the cover since the molding and cover can be brought closer together with less difficulty. Moreover, the inclination acts to hold the edge of the cover in place.

Since the strip or leg 16 projects under the cover 13, the invention permits using an inexpensive ordinary steel without regard to appearance as the flange 17 on the leg 16 is entirely concealed by the folded over edge portions of the lower leg. A cold rolled steel may be used or electrically galvanized or zinc grip ordinary low carbon steel may be employed to minimize rusting under the cover or along the edge of the latter. The leg 20 may be constructed of metal having a desired fine finish or appearance such as stainless steel or chrome plated steel. As for thickness, the strip 15 may be of .025 inch gauge or thickness and the leg .018 inch gauge, although the thickness of either may be varied.

The two legs or strips may be formed and assembled by suitable roll machines adapted to shape the edges and lock them together.

In general, the invention provides an inexpensive but very desirable molding for the purposes set forth. By using less expensive but strong metal in the upper leg and concealing this metal in the folded interengagement, a cheaper structure is possible while still obtaining the desired ornamental appearance in the exposed portion of the molding. Moreover, the folded interengaging edges obtain a rounded bead appearance along the edge of the covering which is not only ornamental but useful in avoiding sharp edges. Having the construction formed in two parts also enables using a thinner outer strip in the more expensive metal and a stronger or heavier inner strip in the less expensive anchoring metal. Thus, necessary strength of anchoring, combined with desirable appearance, are obtained at minimum cost. It is apparent that the invention may be applied to counter edges or other like corner structures, such as table tops and steps, and reference to covered counters or the like may clearly include such like applications or uses.

Although only one form of the invention has been described and illustrated, it will be apparent to those skilled in the art that various modifications may be made without departing from the spirit of the invention.

What is claimed is:

1. A molding for covered counter edges or the like comprising a substantially flat leg adapted to extend inwardly under the counter covering and constructed of ordinary steel, a second finish leg constructed of a different, ornamental metal and extending from the outer edge of the first leg and adapted to extend downwardly along the side edge of the counter, and means joining the adjacent edge portions of the legs together and comprising interengaging folded edges locking the legs against relative movement.

2. A molding for covered counters or the like comprising a substantially flat leg adapted to extend inwardly under the counter covering and constructed of ordinary steel, a second finish leg constructed of a different, ornamental metal and extending from the outer edge of the first leg and adapted to extend downwardly along the side edge of the counter, and means joining the adjacent edges of the legs together and forming an upwardly disposed shoulder extending along the outer edge of the first leg.

3. A molding for covered counters or the like comprising a substantially flat leg adapted to extend inwardly under the counter covering and constructed of ordinary steel, a second finish leg constructed of a different, ornamental metal and extending from the outer edge of the first leg and adapted to extend downwardly along the side edge of the counter, and means joining the adjacent edges of the legs together and forming an upwardly disposed shoulder extending along the outer edge of the first leg, said shoulder having a rounded upper edge formed by a fold in one of the legs.

4. A molding for covered counter edges or the like comprising a substantially flat leg adapted to extend under the counter covering and terminating at its outer edge in an upwardly directed flange, and a second leg having a body part adapted to extend downwardly along the side edge of the counter and having an upper edge folded over and embracing the flange on the first leg.

5. A molding for covered counter edges or the like comprising a substantially flat leg adapted to extend under the counter covering and terminating at its outer edge in an upwardly directed flange, and a second leg having a body part adapted to extend downwardly along the side edge of the counter and having an upper edge folded over and embracing the flange on the first leg, said flange being substantially in the plane of and constituting a continuation of the body part of the second leg.

6. A molding for covered counter edges or the like comprising a leg having a substantially flat body part adapted to extend under the counter covering and terminating at its outer edge in an upwardly directed flange disposed at an acute angle to the body part, and a second leg having a body part adapted to extend downwardly along the side edge of the counter and having an upper edge folded over and embracing the flange on the first leg, the body part of the second leg being offset inwardly with respect to the outer wall of the folded portion so as to dispose said body part substantially in alignment with the flange and in contact with the under side of the first leg underneath said flange.

7. A molding for covered counter edges or the like comprising a leg having a substantially flat body part adapted to extend under the counter covering and terminating at its outer edge in an upwardly directed flange, and a second leg having a body part adapted to extend downwardly along the side edge of the counter and having an upper edge folded over and embracing the flange on the first leg, the body part of the second leg being offset inwardly with respect to the outer wall of the folded portion so as to provide an inwardly offset part engaging under the first leg beneath the flange, whereby the flange and folded part are locked against separation.

WILLIAM J. HALL.